(12) United States Patent
Van Der Meer et al.

(10) Patent No.: US 7,201,689 B2
(45) Date of Patent: Apr. 10, 2007

(54) METAL DRIVING BELT

(75) Inventors: Cornelis Johannes Maria Van Der Meer, Tilburg (NL); Lucas Hendricus Robertus Maria Prinsen, Loon op Zand (NL); Johannes Hendrikus Van Lith, Berlicum (NL)

(73) Assignee: Van Doorne's Transmissie B.V., Tilburg (NL)

( * ) Notice: Subject to any disclaimer, the term of this patent is extended or adjusted under 35 U.S.C. 154(b) by 539 days.

(21) Appl. No.: 10/721,455

(22) Filed: Nov. 26, 2003

(65) Prior Publication Data

US 2004/0152550 A1  Aug. 5, 2004

(30) Foreign Application Priority Data

Nov. 28, 2002  (NL) ................................ 1022022

(51) Int. Cl.
*F16G 1/22* (2006.01)
*F16G 5/16* (2006.01)

(52) U.S. Cl. ........................ 474/242; 474/201
(58) Field of Classification Search ........ 474/240–245, 474/201
See application file for complete search history.

(56) References Cited

U.S. PATENT DOCUMENTS

| | | | |
|---|---|---|---|
| 3,949,621 A | | 4/1976 | Beusink et al. |
| 4,610,648 A | | 9/1986 | Miranti, Jr. |
| 4,655,732 A | * | 4/1987 | Takashima ................ 474/201 |
| 6,283,882 B1 | * | 9/2001 | Nonaka et al. ............. 474/242 |
| 6,500,086 B2 | * | 12/2002 | Serkh et al. ............... 474/245 |
| 6,599,211 B2 | * | 7/2003 | Sattler ...................... 474/242 |
| 6,634,975 B2 | * | 10/2003 | Yuan ........................ 474/242 |
| 6,679,798 B1 | * | 1/2004 | Takagi et al. .............. 474/242 |
| 6,857,980 B2 | * | 2/2005 | van Liempd et al. ....... 474/242 |

FOREIGN PATENT DOCUMENTS

| | | |
|---|---|---|
| EP | 0 522 612 | 1/1993 |
| EP | 1 069 343 | 1/2001 |

(Continued)

OTHER PUBLICATIONS

Patent Abstracts of Japan, vol. 2000, No. 06, Sep. 22, 2000 & JP 2000 065153 A (Nissan Motor Co Ltd), Mar. 3, 2000.

(Continued)

*Primary Examiner*—Marcus Charles
(74) *Attorney, Agent, or Firm*—Young & Thompson

(57) ABSTRACT

Driving belt provided with an enclosed tension element and metal transverse elements accommodated so as to be movable in a longitudinal direction along the tension element. The transverse elements each comprise a body part, a head part and a neck part therebetween. On either side of the neck part between the body part and the head part two axially oriented openings are present, for accommodating in each a part of the tension element. The body part includes side contact surfaces oriented substantially in an axial direction and diverging from each other in the radial direction, and with a substantially axially oriented tilting line and in which an upper limit of an opening formed by the head part extends in the axial direction at least to an imaginary line, which extends from the radially lower limit to the radially upper limit of the respective opening in line with a contact surface.

15 Claims, 1 Drawing Sheet

FOREIGN PATENT DOCUMENTS

| | | | |
|---|---|---|---|
| EP | 1 221 563 | | 7/2002 |
| JP | 62-137445 A | * | 6/1987 |
| JP | 63-280946 A | * | 11/1988 ................ 474/242 |
| JP | 04-83941 A | * | 3/1992 |
| JP | 20002-168306 A | * | 6/2002 |

OTHER PUBLICATIONS

Patent Abstracts of Japan, vol. 015, No. 264 (M-1132), Jul. 4, 1991 & JP 03 089050 A (Mitsuboshi Belting Ltd., Apr. 15, 1991.

Patent Abstracts of Japan, vol. 015, No. 485 (M-1188), Dec. 9, 1991 & JP 03 209036 A (Mitsuboshi Belting Ltd), Sep. 12, 1991.

Patent Abstracts of Japan, vol. 016, No. 302 (M-1275), Jul 3, 1992 & JP 04 083941 A (Nissan Motor Co Ltd), Mar. 17, 1992.

Patent Abstracts of Japan, vol. 2002, No. 03, Apr. 3, 2002 & JP 2001 330427 A (Honda Motor Co Ltd), Nov. 30, 2001.

Patent Abstracts of Japan, JP 2001-241511, Sep. 7, 2001.

\* cited by examiner

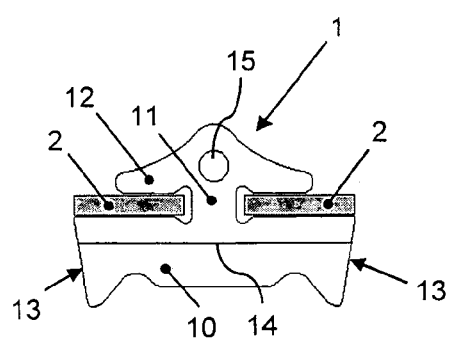
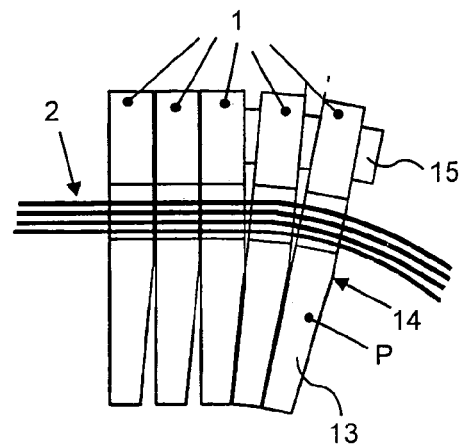
FIG. 1
FIG. 2
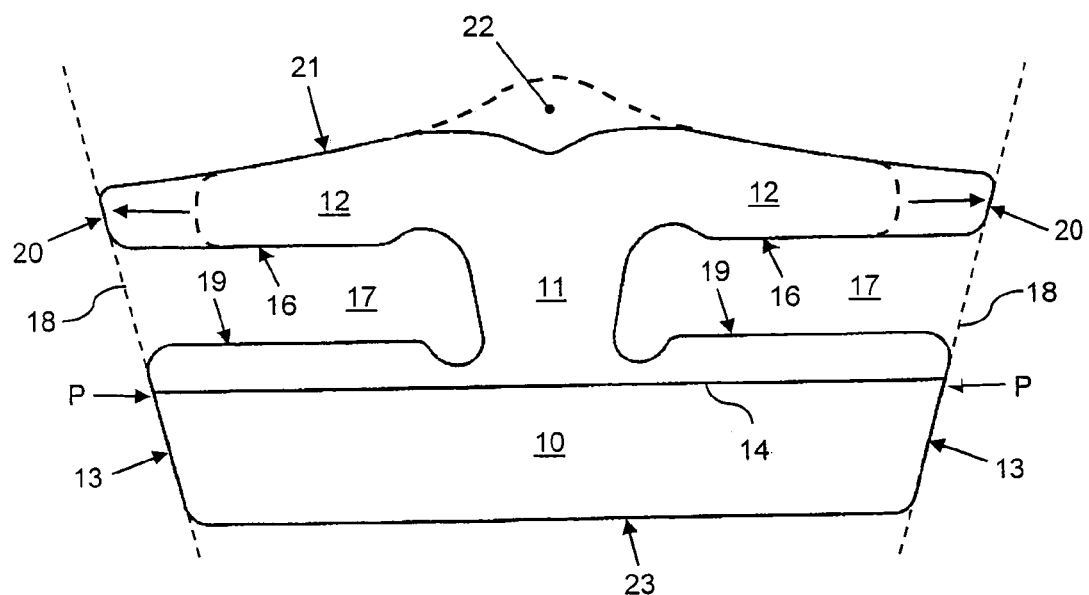
FIG. 3

METAL DRIVING BELT

BACKGROUND OF THE INVENTION

The present invention relates to a metal driving belt for a continuously variable transmission, as described below. Such driving belts are generally known, for example from European Patent Application EP-A-0 522 612 in the name of the applicant. Such driving belts comprise rigid transverse elements, usually made entirely of metal, which are likewise generally known per se, and which are accommodated in the driving belt so that they are movable along an endless tension element. The tension element comprises two parts, each of which is formed by a number of thin, flat rings accommodated around one another, and each accommodated in a laterally or axially oriented opening of the transverse element.

DESCRIPTION OF THE RELATED ART

The known driving belt is used in a transmission, in particular for driving relatively heavy vehicles, such as a motor car or a lorry, and for this purpose is accommodated in a press fit between the sheaves of a primary, generally driving pulley and a secondary, generally driven pulley. The driving belt in a pulley undergoes a driving force, which is transmitted from the pulley to the belt through friction between two substantially laterally or axially directed contact surfaces of the elements and a largely conically shaped contact surface of each of the sheaves of the pulley concerned. The transverse elements in this case are propelled towards the other pulley along the tension element, in the course of which the elements push each other along and are kept in a mutual relationship by the tension element. At the other pulley this pushing force is transmitted between the transverse elements to the sheaves of the elements.

In the known driving belt the contact surfaces of the transverse elements are situated on either side of the so-called body part of the transverse element, which—viewed in the radial direction—is situated inside or below the tension element. The usually substantially trapezium-shaped body part in this case forms an underside of the above-mentioned openings, while a generally arrowhead-shaped head part of the transverse element forms a top side of the openings. Situated between the openings is a so-called neck part of the transverse element that connects the body part and the head part to each other. The head part of the transverse elements is provided on a front side with a centrally positioned projection, which can be accommodated in a hole provided centrally on a rear side of the head part of an adjacent transverse element.

The function of the projection of a transverse element is, inter alia, to prevent the displacement of adjacent transverse elements in the driving belt relative to each other in the radial or axial direction. Such a displacement can in particular occur where the driving belt is wedged between the pulley sheaves and results in tilting of the transverse element relative to the radial direction.

The above-mentioned tilting can be explained by the presence of an imbalance in the magnitude and the radial points of application of the forces acting upon the transverse element in the tangential direction, which direction substantially coincides with the longitudinal direction of the driving belt. These forces are namely at least a friction force prevailing between the pulley sheaves and the contact surfaces of the body part, which friction force in an ideal case has an effective point of application halfway along the radial dimension of the contact surface, a relatively low internal friction force between the tension element and the transverse element, which friction force acts upon the body part at the position of the above-mentioned underside of the axially oriented openings, and a pushing force prevailing between the individual transverse elements, which pushing force acts upon the body part at the position of the axially oriented tilting line over which adjacent transverse elements can tilt in relation to each other. As a result of the above-mentioned imbalance, a couple of forces arises on the transverse element, so that the latter acquires the tendency to tilt. Without countermeasures, the result of this would be that the transverse elements and the pulley sheaves would of necessity move slightly relative to each other, or slip. This slipping would be at the expense of the efficiency of the power transmission, and there would also be a risk of damage to the driving belt and/or the pulleys.

Through the presence of the projection and the hole complementary to it in the adjacent transverse element, a second couple of forces acting in the opposite direction will, however, be produced as a result of this tilting tendency, so that the above-mentioned tilting, and the slipping as a result of that tilting, can be largely avoided.

Although with this known solution the above-mentioned adverse effects themselves can be largely prevented, this solution also has a number of disadvantages. For instance, the projection and the hole are subject to wear during use of the driving belt, as a result of which the driving belt can fail with the passage of time. In addition, the projection must be situated at a certain minimum distance from an edge of the transverse element, in order to be able to achieve sufficient strength of the transverse element, both during manufacture and during use in the driving belt. Furthermore, the projection and the hole have to be made with extremely great accuracy during manufacture.

An alternative solution is known from European Patent Application EP-A-1 221 563 and involves lowering the position of the tilting line in the radial direction to the effective point of application of the friction force between the transverse element and the pulley. However, in such a design a difference in speed in the longitudinal direction between the tension element and the transverse elements will be greater, and consequently also the above-mentioned internal friction. All the above has an adverse effect on the efficiency of the transmission in which the driving belt is being used. Besides, it can be expected that the increasingly unequal distribution of the mass of the transverse element above and below the tilting line will adversely affect a desired movement and orientation of the transverse element during operation.

SUMMARY OF THE INVENTION

In order largely to avoid the above-mentioned limitations and disadvantages of the known solutions, the invention includes the presence of additional contact surfaces on the transverse elements situated radially outside or above the openings on axial ends of the head part. In the driving belt according to the invention an effective point of application of the friction force between the transverse element and a pulley is moved in the radial direction outwards, or upwards, in other words in the direction of the tilting line, so that the above-mentioned couple of forces advantageously can be smaller. With a suitable choice of the radial and axial positions of the contact surfaces of the body part and of the additional contact surfaces of the head part and of their dimensions, it can be ensured that an effective point of application of the last-mentioned friction force in the radial direction substantially coincides with the radial position of the tilting line. If desired, the relatively low internal friction force between the tension element and the transverse element can also be taken into account, by making the above-mentioned point of application act, depending on the internal friction force, slightly above or slightly below the tilting line.

The transverse element according to the invention has the advantage that the projection and the hole can be made smaller, in other words less high and less deep, or it may even be possible to dispense with them entirely. Advantages derived from this are a smaller dimension in the longitudinal direction or thickness of the transverse element, simpler manufacture, or a reduction in weight of the driving belt. The benefit and the application of these advantages in the design, the manufacture and the use of the driving belt are known from the last-mentioned European application. Moreover, the tilting line of the transverse element according to the present invention can be localised near the underside of the above-mentioned openings, so that a difference in speed between the transverse elements and the tension element advantageously can be minimal.

In the driving belt according to the invention, compared with the known design, the head part of the transverse elements is lengthened in the axial direction towards both sides, at least to such an extent that during operation the head part comes into contact with the pulley sheaves. In other words, the upper limit of an opening formed by the head part extends in the axial direction at least to an imaginary line extending between the radially lower and the radially upper limit of the respective opening in line with a contact surface of the body part. The axial ends of the head part are preferably provided with additional contact surfaces specifically intended for the contact.

BRIEF DESCRIPTION OF THE DRAWINGS

The invention will now be explained in greater detail with reference to the drawing, in which corresponding structural parts are indicated by the same reference numerals.

FIGS. 1–2 are a diagrammatic view of the known driving belt in two views.

FIG. 3 is a transverse element for a driving belt according to the present invention.

DESCRIPTION OF THE PREFERRED EMBODIMENTS

FIGS. 1–2 show diagrammatically a cross section of the known driving belt and also a segment of the driving belt in side view. The cross-section shows a two-part tension element 2 in cross section and a transverse element 1 in front view. The transverse element 1 is provided with a substantially trapezium-shaped body part 10 and a substantially arrowhead-shaped head part 12, which parts are interconnected in a neck part 11 of the transverse element 1. Openings are defined on either side of the neck part 11, between the body part 10 and the head part 12, in each of which openings a part of the tension element 2 is accommodated. The front view further shows the contour of a projection 15 in the head part 12, and also the position of a tilting line 14 in the body part 10. The side view shows a number of transverse elements 1, both in a relationship parallel to each other and in a relationship rotated in relation to each other, such as that which occurs between sheaves of a pulley of a continuously variable transmission. In the latter case the transverse elements 1 are rotated in relation to each other about the tilting line 14 below which—in other words viewed in a radially inward pointing direction—the transverse elements 1 taper slightly in order to permit the above-mentioned rotation. It can also be seen in this side view that the tension element is composed of a number of thin, flat rings 2 accommodated around one another, for the sake of clarity some space being left between the individual rings 2 in the figures. In practice, the rings 2 are stacked virtually without space between them.

In the rotated state of the transverse elements 1 the elements are wedged between the pulley sheaves at the position of substantially axially directed contact surfaces 13 on either side of the body part 10, which contact surfaces 13 diverge radially outwards to some extent relative to each other. With a uniform distribution of the contact pressure between a pulley sheave and a contact surface 13 an effective point of application P of a friction force on the transverse element 1 will be situated centrally on the contact surface 13. However, a pushing force between the individual transverse elements 1 acts upon the tilting line 14. Besides, there is generally a friction force present between the tension element 2 and the transverse elements 1. The above-mentioned forces interact in such a way that during operation the transverse elements 1 between the pulley sheaves have the tendency to tilt over backwards, to which end the elements 1 must shift in relation to each other in the radial direction. This tendency is counteracted in the known driving belt by the fact that the projection 15 of a following transverse element 1 engages in a hole (not shown) of a preceding transverse element 1. According to a known alternative embodiment of the transverse element 1, the above-mentioned tendency can be counterbalanced at least to a substantial degree by moving the tilting line 14 radially inwards to the effective point of application P of the friction force.

As already pointed out, the above-mentioned known solutions do, however, have major disadvantages as regards the most efficient possible functioning of the driving belt. The present invention therefore proposes an alternative embodiment of the transverse element 1, which embodiment is illustrated in FIG. 3. In the driving belt according to the invention the head part 12 of the transverse elements 1 is extended in the axial direction towards both sides—as indicated by the two horizontal arrows—to such a degree that during operation the head part 12 comes into contact with the pulley sheaves. In other words, the upper limit 16 of an opening 17 formed by the head part 12 extends in the axial direction at least to an imaginary line 18, which extends from a lower limit 19 of the respective opening 17 formed by the body part 10 to the above-mentioned radially upper limit 16 of the respective opening in line with a contact surface 13. The axial ends of the head part 12 are preferably provided with additional contact surfaces 20 specifically intended for contact with the pulley sheaves. In particular, the additional contact surfaces 20 each lie substantially in line with one of the contact surfaces 13 of the body part 10.

In the driving belt according to the invention, owing to the presence of the second, additional contact surface 20 in the head part 12, an effective point of application P of the friction force between the transverse element and a pulley sheave is moved in the direction of the tilting line, so that a couple of forces between the friction force and the pushing force between the transverse elements decreases at the level of the tilting line 14. With a suitable choice of the radial and axial positions of the contact surfaces 13 of the body part 10 and of the additional contact surfaces 20 of the head part 12 and of its dimensions, it can be ensured that an effective point of application P of the last-mentioned friction force in the radial direction substantially coincides with the radial position of the tilting line 14. With the measure according to the invention it is therefore possible in a relatively simple manner to ensure that a common moment of force of the forces acting upon the transverse element 1 is greatly reduced, and in certain circumstances even substantially eliminated. Of course, in this case the internal friction force between the tension element 2 and the transverse element 1 can also be taken into account.

In many cases the radial dimension or the height of the additional contact surfaces 20 can be relatively small, since the surfaces are considerably further away from the tilting line 14 than the contact surfaces 13 of the body part 10. In other words, the part of the friction force acting upon the additional contact surfaces 20 between transverse element 1 and pulley already at a relatively small value of the above-mentioned part will still exert a considerable moment of force at the position of the tilting line 14. According to a further embodiment of the invention, a radial dimension of the additional contact surfaces 20 has a value in the region of ⅕ to ⅓ of the radial dimension of the contact surfaces 13 of the body part 10, preferably approximately equal to ⅓.

Depending on the mechanical rigidity with which the pulleys and the transverse elements 1 are designed, and the magnitude of the forces applied during operation, the additional contact surfaces 20 can also be provided in the axial direction until slightly past the line of the corresponding contact surfaces 13 of the body part 10. In this case the axial ends of the head part 12 will deform or bend slightly during operation, under the influence of the clamping force exerted by the pulley sheaves, until the body part 10 also makes contact with the sheaves. In this way the distribution of the contact pressure between the contact surfaces 13 and the additional contact surfaces 20 can be influenced to the advantage of the latter, for example in order to compensate for a reduction in the latter as a result of a bending of the pulley sheaves.

In an advantageous embodiment of the last-mentioned measure a radially outermost edge 21 of the head part 12 is provided with a centrally situated indentation 22 of the transverse element at least relative to an otherwise more or less arrowhead-shaped exterior of the head part 12. As a result of this, it is ensured that, if the axial ends of the head part 12 bend during operation, such bending will be directed radially outwards, so that an undesired contact between the head part 12 and the tension element 2 is advantageously avoided. It is also ensured by this means that such bending can occur relatively easily. In a particularly efficient construction for this purpose, this measure reduces the chance of breaking of the transverse element 1, in particular where the head part 12 connects to the neck part 11. In a very advantageous embodiment of this measure, the indentation 22 is of a substantially V-shaped design.

In order to make the transverse element 1 very robust, the bottom or radially innermost edge 23 of the body part 10 is oriented substantially axially at least at the axial position of the neck part 11 and the latter is preferably situated over the entire axial dimension or width of the transverse element 1 at the same radial position as an underside of the contact surfaces 13 of the body part 10, or below that, at a position situated radially further inwards. This measure in a construction which is extremely efficient for that purpose reduces the chance of breaking, in particular where the body part 10 connects to the neck part 11.

In this respect it is also advantageous according to the invention for the neck part 11 to diverge radially outwards in the axial direction, in other words it becomes broader. This measure in a construction which is extremely efficient for that purpose reduces the chance of breaking, in particular where the head part 12 connects to the neck part 11.

It is remarked that from the Japanese patent publication JP-2001-241511 there is known a transverse element 1 having additional pulley contact surfaces located above the tension element 2 in radial direction. Rather than the transverse element 1 according to the invention, this known element design is provided with a projection and hole for prohibiting adjacent elements to mutually move in radial direction. As explained in the above, such projection and hole may be obviated in accordance with the present invention, at least for prohibiting mutual element movement in the radial direction.

Also, the additional pulley contacting surfaces in this known design are indicated to be relatively large as compared to contact surfaces of the body part thereof, while the head part carrying the same is produced relatively sturdy. By these measures the contact pressures will be more or less the same for both types of pulley contact surfaces and the friction force on the element will be born to a significant extend by the additional, i.e. upper contact surfaces. This feature puts a considerable strain on the neck part of the element, which is thus to be designed also relatively sturdy, e.g. bulky. Moreover, the friction force on the upper contact surfaces provides the known elements with a tendency to tilt forwards, i.e. over-compensates the above-mentioned tendency to tilt backwards, such that the projection and hole are indeed still required to counteract the tilting of the elements relative to the radial direction in this known design.

In contrast herewith, in the element design according to the invention the friction force between the pulley and the elements 1 is still taken up predominantly by the body contact surfaces 13 thereof, whereby the additional contact surfaces 20 predominantly serve to keep the elements upright, i.e. to maintain a proper, predominantly radially aligned orientation thereof. Because of this restricted function of the element head part 12, the dimensions required for the head part 12 and the neck part 11 to guide the friction force exerted on the additional contact surfaces 20 to the tilting line 14 are significantly smaller than that of the known design. Moreover, the head part 12 is designed considerably less stiff than the body part 10 such that also the contact pressure on the additional contact surfaces 20 will be relatively low, for example by the small radial dimension of the head part 12 above the opening 17 compared with that of the body part 10 below the opening 17 and also by the provision of a centrally positioned indentation 22. In any case the radial dimension of the additional contact surface 20 is preferably about one third of that of the body contact surface 13, possibly even smaller down to one fifth. These features render the axially extending parts of the head part 12 relatively flexible, such that they may bend upward.

Apart from what is described above, the invention also relates to all the details in the figures, at least in so far as such details can be immediately and unequivocally deduced by a person skilled in the art, and to all that is described in the following set of claims.

The invention claimed is:
1. Driving belt, comprising:
an enclosed tension element (2) in the form of a number of nested flat rings; and metal transverse elements (1) movable freely in a longitudinal direction along the tension element (2) and freely movable relative to a circumference of the tension element (2), radial play provided between the tension element and the transverse elements such that the transverse elements tilt relative to the tension element about an axial direction and contact between the tension element and the transverse elements solely takes place by friction, which tension element and transverse elements form a pushbelt to be used wedged between the sheaves of a set of pulleys of a continuously variable transmission, which transverse elements (1) each provided with a body part (10), a head part (12) and a neck part (11) between the latter two parts, on either side of the neck part (11) between the body part (10) and the head part (12) two axially oriented openings (17) being present, in each of which openings a part of the tension element (2) is accommodated, the radially lower limit (19) of each opening (17) formed by the body part (10) being intended for contact with the respective part of the tension element (2), the body part (10) provided on either side with contact surfaces (13) oriented substantially in an axial direction and diverging from each other in the radial direction, which contact surfaces (13) are intended for contact with the sheaves of the pulleys, and which body part (10) is provided with a substantially axially oriented tilting line (14), situated in a front side of the transverse element (1) in said body part (10), and along which two adjacent, mutually contacting transverse elements (1) in the driving belt can rotate in relation to each other, wherein an upper limit (16) of each opening (17) formed by the head part (12) extends in the axial direction at least to an imaginary line (18), which extends from the radially lower limit (19) to the radially upper limit (16) of the respective opening (17) in line with a corresponding contact surface (13), and wherein axial ends of the head part (12) are each provided with an additional contact surface (20) oriented substantially in the axial direction and intended for contact with the sheaves of the pulleys, and wherein a radial or height dimension of the additional contact surfaces (20) of the head part (12) is at most equal to one third of a radial dimension of the contact surfaces (13) of the body part (10) and is larger than one fifth of that dimension.

2. Driving belt according to claim 1, characterised in that the additional contact surfaces (20) of the head part each lie substantially in line with one of the contact surfaces (13) of the body part (10).

3. Driving belt according to claim 1, characterised in that the additional contact surfaces (20) of the head part (12) are situated outside an area defined between two imaginary lines (18), which imaginary lines (18) extend from the lower limit (19) to the upper limit (16) of the openings (17) in line with the contact surfaces (13) of the body part (10).

4. Driving belt according to claim 1, characterised in that a radially outermost edge (21) of the head part (12) is provided with a centrally positioned indentation (22), at least viewed relative to an otherwise substantially arrowhead-shaped exterior of the head part (12).

5. Driving belt according to claim 1, characterised in that the neck part (11) diverges radially outwards in the axial direction.

6. Driving belt according to claim 1, characterised in that a radially innermost bottom edge (23) of the body part (10), at least at the axial position of the neck part (11), is i) oriented at least substantially axially and ii) over the entire axial widthwise dimension of the transverse element (1), is situated at substantially the same radial position as a radial underside of the contact surfaces (13) of the body part (10), or at a position situated radially inwards.

7. Driving belt, according to claim 1, wherein each transverse element (1) is with free of further means preventing a displacement of adjacent transverse elements (1) in the driving belt relative to each other in the radial direction, including being free of any projection (15) and hole that mutually engage in the radial direction between the adjacent elements (1).

8. A driving belt, comprising:

an enclosed tension element (2) comprised of plural nested flat rings; and plural all-metal transverse elements (1) freely movable in a longitudinal direction along the tension element (2) and relative to a circumference of the tension element (2) with radial play provided between the tension element and the transverse elements such that the transverse elements tilt relative to the tension element about an axial direction and contact between the tension element and the transverse elements solely takes place only by friction, the tension element and transverse elements forming a pushbelt to be wedged between sheaves of a set of pulleys of a continuously variable transmission, each transverse element (1) provided with a body part (10), a head part (12), a neck part (11) between the body and head two parts, and an axially oriented opening (17) on each side of the neck part (11) between the body part (10) and the head part (12), in each of the openings (17) a part of the tension element (2) is accommodated, a radially lower limit (19) of each opening (17) for contact with the respective part of the tension element (2), contact surfaces (13) provided of either side of the body part (10), the contact surfaces (13) oriented substantially in an axial direction and diverging from each other in the radial direction, the contact surfaces (13) for contact with the sheaves of the pulleys, and a substantially axially oriented tilting line (14) provided on a front side of the body part (10) and along the tilting line (14) two adjacent, mutually contacting transverse elements (1) in the driving belt can rotate in relation to each other, wherein a radially upper limit (16) of each opening (17) formed by the head part (12) extends in the axial direction at least to an imaginary line (18), which extends from the radially lower limit (19) to the radially upper limit (16) of the respective opening (17) in line with a corresponding contact surface (13), wherein axial ends of the head part (12) are each provided with an additional contact surface (20), oriented substantially in the axial direction, for contact with the sheaves of the pulleys, and wherein a radial or height dimension of the contact surfaces (20) of the head part (12) is at most equal to one third of a radial dimension of the contact surfaces (13) of the body part (10) and is larger than one fifth of that dimension.

9. Driving belt according to claim 8, wherein, the additional contact surfaces (20) of the head part each lie substantially in line with one of the contact surfaces (13) of the body part (10).

10. Driving belt according to claim 8, wherein, the additional contact surfaces (20) of the head part (12) are situated outside an area defined between two imaginary lines (18), which imaginary lines (18) extend from the lower limit (19) to the upper limit (16) of the openings (17) in line with the contact surfaces (13) of the body part (10).

11. Driving belt according to claim 8, wherein, a radially outermost edge (21) of the head part (12) is provided with a centrally positioned indentation (22), at least viewed relative to an otherwise substantially arrowhead-shaped exterior of the head part (12).

12. Driving belt according to claim 8, wherein, the neck part (11) diverges radially outwards in the axial direction.

13. Driving belt according to claim 8, wherein, a bottom edge (23) of the body part (10) is
    i) oriented at least substantially axially, and
    ii) over the entire axial or widthwise dimension of the transverse element (1), is situated at substantially the same radial position as a radial underside of the contact surfaces (13) of the body part (10).

14. Driving belt according to claim 8, wherein each transverse element (1) is free of any projection (15) and corresponding hole that mutually engage in the radial direction between the adjacent elements (1).

15. A metal pushbelt driving belt for a continuously variable transmission, comprising:
    plural rigid transverse elements made entirely of metal, each transverse element (1) provided with a body part (10), a head part (12), a neck part (11) between the body and head two parts, and an axially oriented opening (17) on each side of the neck part (11) between the body part (10) and the head part (12); and
    an endless tension element accommodating the transverse elements with the transverse elements freely movable along the endless tension element, the tension element comprising plural flat rings accommodated around one another, each ring accommodated in one of the openings (17),
    the transverse elements and tension element forming a pushbelt for press fit between sheaves of a primary pulley and a secondary pulley, the pushbelt undergoing a driving force transmitted through friction between contact surfaces of the transverse elements and a conically shaped contact surface of each of the sheaves, wherein,
    a radially lower limit (19) of each opening (17) for contacts with a respective part of the tension element (2),
    the contact surfaces (13) of the transverse elements are provided of either side of the body part (10), the contact surfaces (13) oriented substantially in an axial direction and diverging from each other in the radial direction, and
    a substantially axially oriented tilting line (14) is provided on a front side of the body part (10) and along the tilting line (14) two adjacent, mutually contacting transverse elements (1) in the driving belt can rotate in relation to each other,
    a radially upper limit (16) of each opening (17) formed by the head part (12) extends in the axial direction at least to an imaginary line (18), which extends from the radially lower limit (19) to the radially upper limit (16) of the respective opening (17) in line with a corresponding contact surface (13),
    axial ends of the head part (12) are each provided with an additional contact surface (20), oriented substantially in the axial direction at least to the imaginary line (18), for contact with the sheaves of the pulleys, and
    a radial or height dimension of the contact surfaces (20) of the head part (12) is at most equal to one third of a radial dimension of the contact surfaces (13) of the body part (10) and is larger than one fifth of that dimension.

\* \* \* \* \*